United States Patent [19]

Curtis

[11] 4,318,623

[45] Mar. 9, 1982

[54] ALTERNATE LIQUID FUEL PROCESSING APPARATUS

[75] Inventor: William S. Curtis, Hayward, Calif.

[73] Assignee: Alternate Liquid Fuels Corp., Oakland, Calif.

[21] Appl. No.: 96,012

[22] Filed: Nov. 20, 1979

[51] Int. Cl.³ .............................................. B01F 15/06
[52] U.S. Cl. .................................... 366/144; 366/159; 366/336
[58] Field of Search ............... 366/136, 137, 159, 144, 366/145, 148, 149, 348, 349; 60/39.28 R; 137/334

[56] References Cited

U.S. PATENT DOCUMENTS

| | | | |
|---|---|---|---|
| 2,301,203 | 11/1942 | Doane | 366/137 |
| 3,051,453 | 8/1962 | Sluijters | 366/337 |
| 3,126,942 | 3/1964 | Tyler | 60/39.28 R |
| 3,751,009 | 8/1973 | Archer | 366/337 |

*Primary Examiner*—Robert W. Jenkins
*Attorney, Agent, or Firm*—Brumbaugh, Graves, Donohue & Raymond

[57] ABSTRACT

An apparatus used in conjunction with a fuel storage tank for processing alternate liquid fuels is provided. The apparatus comprises a fuel filter, variable speed power source, positive displacement pump, a fuel heater, gear reduction and a STATIC MIXER arranged in series between inlet and outlet ports of the same storage tank. The alternate liquid fuel components are advanced through the series between the two ports to achieve the necessary mixture desired for combustion.

5 Claims, 2 Drawing Figures

ALTERNATE LIQUID FUEL PROCESSING APPARATUS

BACKGROUND OF THE INVENTION

The present invention relates to apparatus used in conjunction with a mixing tank to process various combustible fuel components to form a new homogeneous, stable "alternate liquid fuel" mixture which will not stratify or separate. Further, the invention relates to the particular arrangement of a series of components required to accomplish the needed recirculation and processing and by mechanical means to yield the new homogeneous "alternate liquid fuel." The apparatus is located between the outlet port of the mixing tank and the inlet port of the mixing tank to provide the recirculation, mixing, and mechanical lock bonding of the various components.

In accordance with U.S. patent application Ser. No. 886,380 filed Mar. 14, 1978, pertinent portions of which are incorporated herein by reference, it is known that an alternate liquid fuel, which can be used as a substitute for fuel oil in large commercial and industrial boilers or as fuel for internal combustion engines, can be mixed from petroleum products previously thought to be unusable. The disclosure in the prior application describes a method for mixing high volatility combustible fuels, including waste products, with contaminated batches of fuel oils; such as navy special, ASTM fuel oil grade #6 from barge and tank bottoms, bunker "C" oil, and pipeline interfaces, and particularly those fuel oils having a higher viscosity than is normally useful in commercial boilers. These fuels are appropriately blended to form a homogeneous alternate liquid fuel capable of being stored and used at a later time.

It is an object of the present invention to provide an apparatus which is capable of efficiently and economically producing the alternate liquid fuel described in this referenced copending application.

It is a further object of the present invention to provide, where needed, a means for preheating the alternate liquid fuel components by using waste heat generated by the engine which powers the apparatus. Preheating the alternate liquid fuel components facilitates their transmission through the apparatus by reducing their viscosity. This increases the efficiency of the apparatus without the addition of an energy-consuming preheating device.

SUMMARY OF THE INVENTION

In accordance with the present invention there is provided an apparatus that is used in conjunction with a fuel storage tank for processing alternate liquid fuels. The apparatus develops and lock-bonds consistently homogeneous and alternate liquid fuels that are contained in the storage tank. The apparatus is comprised of a fuel filter such as a basket strainer, a variable speed power source, a positive displacement pump, a fuel heater where indicated, gear reduction, and a STATIC MIXER that are arranged in series between an outlet port of the storage tank and an inlet port of the same tank. The alternate liquid fuel components are advanced through the series connected elements between the two ports of the storage tank in order to achieve the necessary mixture desired for combustion.

The fuel components are advanced by means of a variable speed power source driving a positive displacement pump. Pump capacity and speed are such that the predetermined fluid velocity and pressure can be maintained. Undesirable particles are removed from the fuel components by, for example, a dual strainer which is capable of being cleaned without interrupting the flow of the alternate liquid fuel components.

In a preferred embodiment of the invention the components are preheated by a heat exchanger to which heat is provided by the exhaust of an internal combustion engine that drives the fuel pump. There is also provided in this configuration controllable bypass means by which the alternate liquid fuel components can be made to bypass the heater altogether.

For a better understanding of the present invention, together with other and further objects, reference is made to the following description, taken in conjunction with the accompanying drawing, and its scope will be pointed out in the appended claims.

DESCRIPTION OF THE INVENTION

Figure 1:
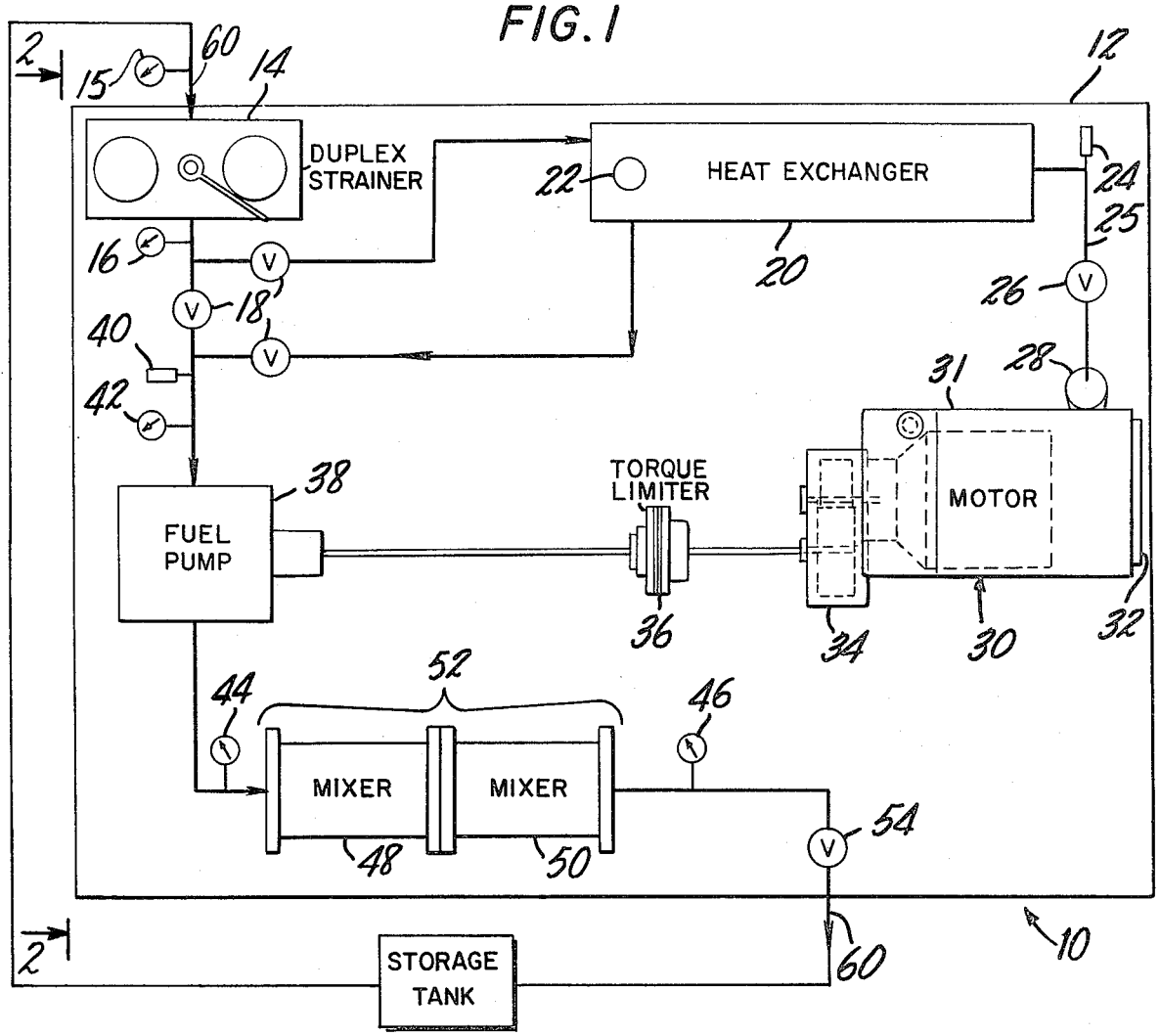
FIG. 1 is a schematic of the apparatus in accordance with the present invention as it may be used in connection with an alternate liquid fuel storage tank.
Figure 2:
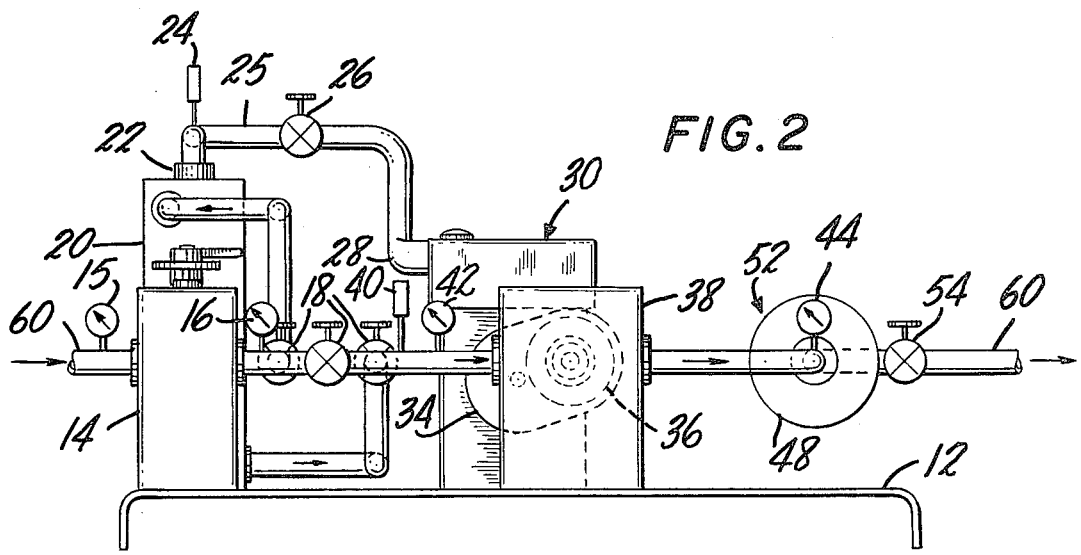
FIG. 2 is a front view of the apparatus in the same configuration as shown in FIG. 1.

Referring to FIG. 1 and FIG. 2, the pertinent elements of the apparatus 10 are schematically shown supported on a base of 12. The unmixed components of the alternate liquid fuel are transmitted in the direction of the arrows in FIG. 1 from fuel storage tank 60 through a filter 14. The filter may be composed of either single or duplex twin basket, metal strainers through which the components flow thereby removing unwanted particles from the fuel components. After the basket strainer is filled with unwanted residuum it is simply removed, cleaned and replaced. If the filter is a single basket strainer the flow of the components must be interrupted but if the filter is a twin basket strainer the strainer may be cleaned without interruption of the flow of the alternate liquid fuel components. A magnetic insert element may be placed in the suction line to remove metal particles small enough to escape through the strainer. Pressure drop across the strainer is measured via gauge(s) 15 and 16 to assist in determining whether the strainer needs cleaning.

After passing through strainer element 14, the fuel components may be routed through a heat exchanger 20 by using control valves 18. An operator can determine whether or not the fuel components should be passed through heat exchanger 20 by comparing the pressure and temperature of the components as indicated on pressure gauges 16, 42 and 44 and temperature gauge 40 with predetermined optimum mixing parameters which depend on the components being mixed.

The fuel components are transmitted through the entire apparatus by means of a positive displacement liquid pump 38 which has a power source 30. In one embodiment of the invention the power source 30 is a variable speed electric motor and in another an internal combustion engine. The power source 30 has a control panel 32 and transmits power to the fuel pump 30 by means of clutch and reduction gear assembly 34 and a torque limiter 36. The torque limiter 36 protects the power source from overload by slipping when the torque demand exceeds a preset value as a result of shock loads, overloads, etc. Due to the varied consistencies and unrefined quantity of many of the alternate liquid fuel components, such changing load conditions which require some type of protective device may be encountered.

The final stage of the apparatus is the synthesizing stage 52 comprised STATIC MIXERS 48 (and 50 if needed) which are well known in the industry and have a series of baffles and orifices through which the fluids to be mixed are pumped. The fluids are mixed by the sheer forces and turbulence developed by passage of the fluid through the STATIC MIXER. Pressure gagues 44 and 46 are provided for the operator to maintain vigilance over a constant flow of the components through the mixing stage 52. Check valve 54 is provided to prevent back flow of the mixed alternate liquid fuel as it reenters storage tank 60.

In a preferred embodiment of the invention the power source 30 for the pump 38 is an internal combustion engine having an optional weather closure and fuel tank 31. There is also provided a means 25 for piping the hot exhaust gases from the internal combustion engine exhaust 28 to the heat exchanger 20. The exhaust gases are then ultimately released to the atmosphere through heat exchanger exhaust outlet 22. The means for piping the hot exhaust gases to the heat exchanger is equipped with a temperature gauge 24 by which the operator may monitor the exhaust temperature. When the heat exchanger 20 is not being utilized, the exhaust gases may be directed into the atmosphere before passing through the heat exchanger by means of a bypass control 26.

The arrow before the stainer 14 represents the introduction of the alternate liquid fuel components into the apparatus of the invention from the outlet port preferably arranged near the bottom of a storage tank. The continuation of the transmission line after the check valve 54 is where the processed alternate liquid fuel exits the apparatus and enters the storage tank preferably near the top of the tank. The arrangement of the elements of the invention in the figure is an example of how the invention may be used in connection with the storage tank which contains the alternate liquid fuel.

The apparatus of the invention is operated after the fuel components are placed in a storage tank. The apparatus circulates, filters, heats, and mixes fuel components until a homogeneous mixture is achieved. The necessary time will vary according to the compatibility of the fuel components and the capacity of the pump and the volume of fuel components. Mixture is terminated when uniform fuel samples are obtained from the top and bottom of the storage tank.

While there has been described what is believed to be the preferred embodiment of the invention, those skilled in the art will realize that changes and modifications may be made thereto without departing from the spirit of the invention, and it is intended to claim all such changes and modifications as fall within the true scope of the invention.

I claim:

1. Apparatus for use in connection with a fuel storage tank for processing fuel components contained in said tank to develop a homogeneous and stable alternate liquid fuel comprising a fuel filter, a pump driven by a power source, a fuel heater and a STATIC MIXER which are arranged in series for fluid transmission between an outlet of said tank and an inlet of said storage tank, wherein said power source is an internal combustion engine having an exhaust, and wherein said heater comprises a heat exchanger to which heat is provided by said exhaust of said engine.

2. Apparatus according to claim 1 wherein said power source comprises a variable speed power service having a load control.

3. Apparatus according to claim 2 wherein said load control is comprised of a torque limiter arranged between said pump and said power source.

4. Apparatus according to claim 1 wherein valves are provided for by-passing said heater.

5. Apparatus according to claim 1 wherein the fuel filter is capable of being cleaned without interruption of the flow of alternate liquid fuel components.

* * * * *

UNITED STATES PATENT AND TRADEMARK OFFICE
CERTIFICATE OF CORRECTION

PATENT NO. : 4,318,623

DATED : March 9, 1982

INVENTOR(S) : William S. Curtis

It is certified that error appears in the above—identified patent and that said Letters Patent is hereby corrected as shown below:

Column 3, line 6, after "comprised" insert --of--;
Column 3, line 12, "gagues" should read --gauges--;
Column 3, line 33, "stainer" should read --strainer--
Column 4, line 32, "service" should read --source--.

Signed and Sealed this

Twenty-fifth Day of May 1982

[SEAL]

Attest:

Attesting Officer

GERALD J. MOSSINGHOFF

Commissioner of Patents and Trademarks